(12) United States Patent
Liu

(10) Patent No.: US 8,456,845 B2
(45) Date of Patent: Jun. 4, 2013

(54) POWER MODULE

(75) Inventor: Lei Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 58 days.

(21) Appl. No.: 13/223,213

(22) Filed: Aug. 31, 2011

(65) Prior Publication Data

US 2012/0257352 A1    Oct. 11, 2012

(30) Foreign Application Priority Data

Apr. 8, 2011    (CN) .......................... 2011 1 0087902

(51) Int. Cl.
  *H05K 5/02*    (2006.01)
  *H05K 7/20*    (2006.01)
(52) U.S. Cl.
  USPC ........... 361/727; 361/695; 361/728; 361/729; 361/730; 361/731; 361/732; 361/733; 361/747
(58) Field of Classification Search
  USPC ................... 361/695, 747, 727–733
  See application file for complete search history.

(56) References Cited

U.S. PATENT DOCUMENTS

| | | | | | |
|---|---|---|---|---|---|
| 3,879,812 | A | * | 4/1975 | Clinch | 24/598.1 |
| 4,062,430 | A | * | 12/1977 | Momberg | 191/12 R |
| 4,067,526 | A | * | 1/1978 | Storer | 248/65 |
| 4,133,971 | A | * | 1/1979 | Boyd et al. | 174/46 |
| 4,536,052 | A | * | 8/1985 | Baker et al. | 439/544 |
| 5,044,976 | A | * | 9/1991 | Thompson | 439/368 |
| 5,348,495 | A | * | 9/1994 | Kasden | 439/371 |
| D373,525 | S | * | 9/1996 | Roethler | D8/367 |
| 5,577,932 | A | * | 11/1996 | Palmer | 439/501 |
| 5,655,924 | A | * | 8/1997 | Cross et al. | 439/373 |
| 5,735,701 | A | * | 4/1998 | Jarrett | 439/147 |
| 5,989,052 | A | * | 11/1999 | Fields et al. | 439/373 |
| 5,992,788 | A | * | 11/1999 | Glass | 242/400.1 |
| 6,012,940 | A | * | 1/2000 | Wheeler | 439/369 |
| 6,071,142 | A | * | 6/2000 | Blackman | 439/373 |
| 6,142,796 | A | * | 11/2000 | Behl et al. | 439/131 |
| 6,276,952 | B1 | * | 8/2001 | Ferranti et al. | 439/345 |
| 6,307,737 | B1 | * | 10/2001 | Ogawa et al. | 361/679.61 |
| 6,411,526 | B1 | * | 6/2002 | Nguyen et al. | 361/829 |
| 6,428,333 | B1 | * | 8/2002 | Rust | 439/140 |
| 6,439,917 | B2 | * | 8/2002 | Tonozuka | 439/372 |
| 6,491,539 | B1 | * | 12/2002 | Johnston | 439/373 |
| 6,676,435 | B2 | * | 1/2004 | Momiyama | 439/372 |
| 6,711,012 | B1 | * | 3/2004 | Medin et al. | 361/679.45 |
| 6,739,896 | B2 | * | 5/2004 | Sivertsen | 439/371 |

(Continued)

*Primary Examiner* — Anatoly Vortman
(74) *Attorney, Agent, or Firm* — Altis Law Group, Inc.

(57) ABSTRACT

A power module includes a power source comprising an end defining a socket, an external power line comprising a plug inserted into the socket, a fixing piece fixed at the end of the power source, and a clamping piece. The clamping piece includes a base mounted on the fixing piece, two parallel fixing portions extending from the base and defining a slot therebetween, a hook positioned on one of the fixing portions and extending in the slot, and a clamping band. The clamping band includes a fixed end fixed on the base and a slide end. The slide end includes spaced fixing teeth, a fixing groove is defined between each two of the fixing teeth, the clamping band winds around the external power line, the hook is engaged with one fixing groove to lock the slide end, and the clamping band and the base cooperatively hold the external power line.

6 Claims, 3 Drawing Sheets

U.S. PATENT DOCUMENTS

| | | | |
|---|---|---|---|
| 6,767,237 B1 * | 7/2004 | Shih | 439/371 |
| 6,769,930 B1 * | 8/2004 | McDevitt, Jr. | 439/373 |
| 6,939,161 B1 * | 9/2005 | Yi et al. | 439/373 |
| 7,014,493 B1 * | 3/2006 | Battard | 439/373 |
| 7,056,145 B2 * | 6/2006 | Campbell et al. | 439/373 |
| 7,134,902 B1 * | 11/2006 | Lewis et al. | 439/373 |
| 7,200,004 B2 * | 4/2007 | Chen et al. | 361/679.39 |
| 7,207,826 B1 * | 4/2007 | Yang | 439/373 |
| 7,241,163 B1 * | 7/2007 | Cox et al. | 439/445 |
| 7,355,116 B2 * | 4/2008 | Chen et al. | 174/50 |
| 7,429,701 B1 * | 9/2008 | Kushnir et al. | 174/53 |
| 7,484,990 B1 * | 2/2009 | Lee et al. | 439/369 |
| 7,513,791 B1 * | 4/2009 | Gary | 439/373 |
| 7,695,305 B1 * | 4/2010 | Ray et al. | 439/359 |
| 7,722,380 B1 * | 5/2010 | West et al. | 439/373 |
| 7,731,524 B2 * | 6/2010 | Dittus et al. | 439/533 |
| 7,850,478 B2 * | 12/2010 | Lin et al. | 439/373 |
| 7,857,654 B2 * | 12/2010 | West et al. | 439/373 |
| 8,248,820 B2 * | 8/2012 | Wu et al. | 361/807 |
| 2002/0068477 A1 * | 6/2002 | Chen-Chiang et al. | 439/373 |
| 2005/0170678 A1 * | 8/2005 | Donahue | 439/214 |
| 2006/0046557 A1 * | 3/2006 | Pulizzi et al. | 439/371 |
| 2006/0264087 A1 * | 11/2006 | Woellner et al. | 439/371 |
| 2010/0248523 A1 * | 9/2010 | Liu et al. | 439/352 |
| 2012/0097804 A1 * | 4/2012 | Liu | 248/68.1 |

* cited by examiner

POWER MODULE

BACKGROUND

1. Technical Field

The present disclosure relates to a power module.

2. Description of Related Art

Redundant power modules are widely used in computers. The redundant power module includes two power sources so that if one breaks down, the other can immediately take over to prevent loss of data. However, the broken down power source cannot be replaced easily as the space in a computer case is usually small. Furthermore, in use, plugs are inserted into sockets of the redundant power module for connecting a external power source, however, over time the connection between the plugs and the sockets may loosen.

Therefore, it is desirable to provide a power module, which can overcome the limitations described.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
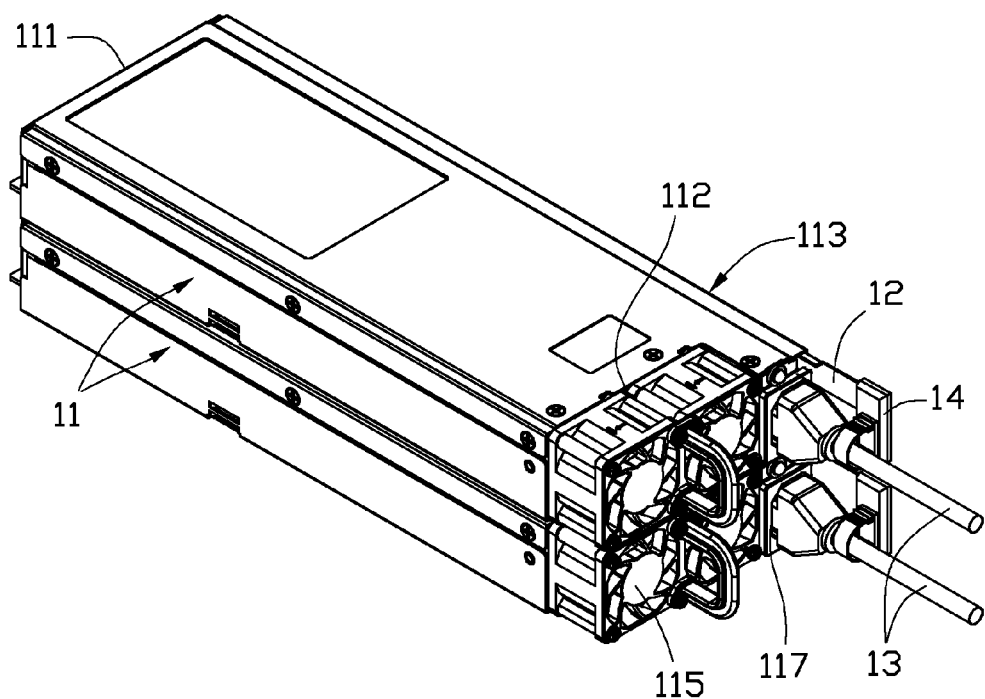
FIG. 1 is a schematic, isometric view of a power module according to an exemplary embodiment.
Figure 2:
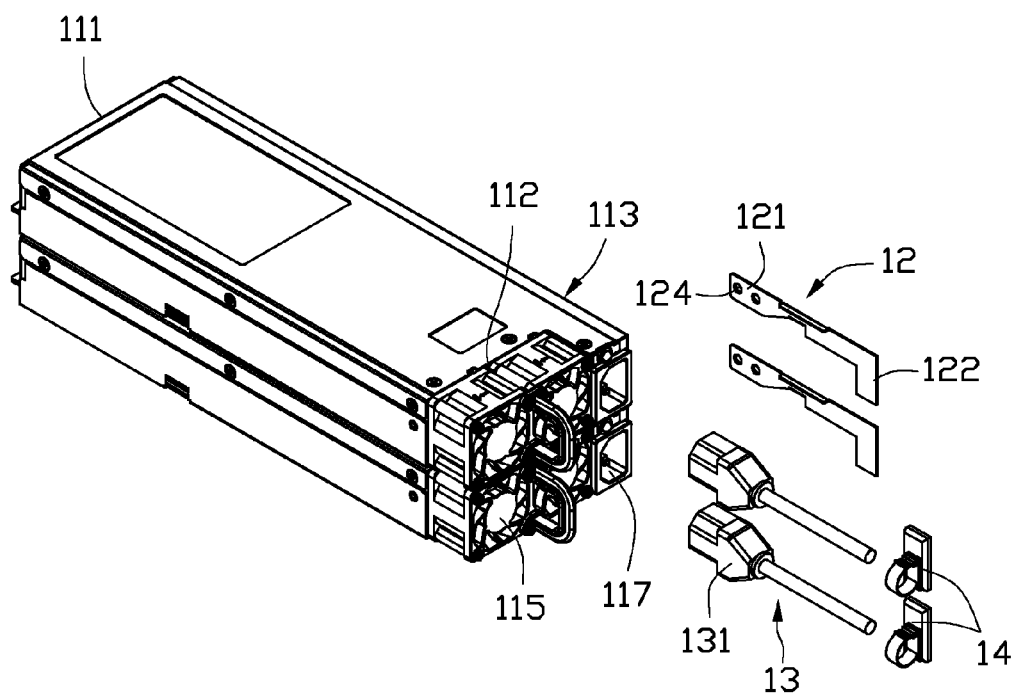
FIG. 2 is an exploded view of FIG. 1, showing that the power module includes two clamping pieces.

Referring to FIGS. 1 and 2, a power module 10 according to an exemplary embodiment is disclosed. The power module 10 is mounted in a computer case (not shown) by means of fasteners such as screws. The power module 10 includes two power sources 11, two fixing pieces 12, two external power lines 13, and two clamping pieces 14.

The two power sources 11 are stacked together. Each power source 11 includes a first end 111 and an opposite second end 112. In this embodiment, each power source 11 is cuboid and includes four successively connected sidewalls 113. The first end 111 includes interfaces that electrically connect to components of the computer (not shown). The second end 112 includes two fans 115 and a socket 117. The two fans 115 are electrically connected to the power source 11 and used to dissipate heat generated by the power source 11. The socket 117 is adjacent to one of the sidewalls 113.

The two fixing pieces 12 are L-shaped. Each of the two fixing pieces 12 includes a connecting part 121 and a fixing part 122. The connecting part 121 defines two connecting holes 124. The connecting holes 124 are configured for being engaged with screws to fix the fixing piece 12 on one of the sidewalls 113 adjacent to the socket 117. The fixing part 122 is away from the socket 117.

One end of each external power line 13 includes a plug 131. The plugs 131 are inserted into the corresponding socket 117 to electrically connect the power sources 11 to an external power source (not shown).

Figure 3:
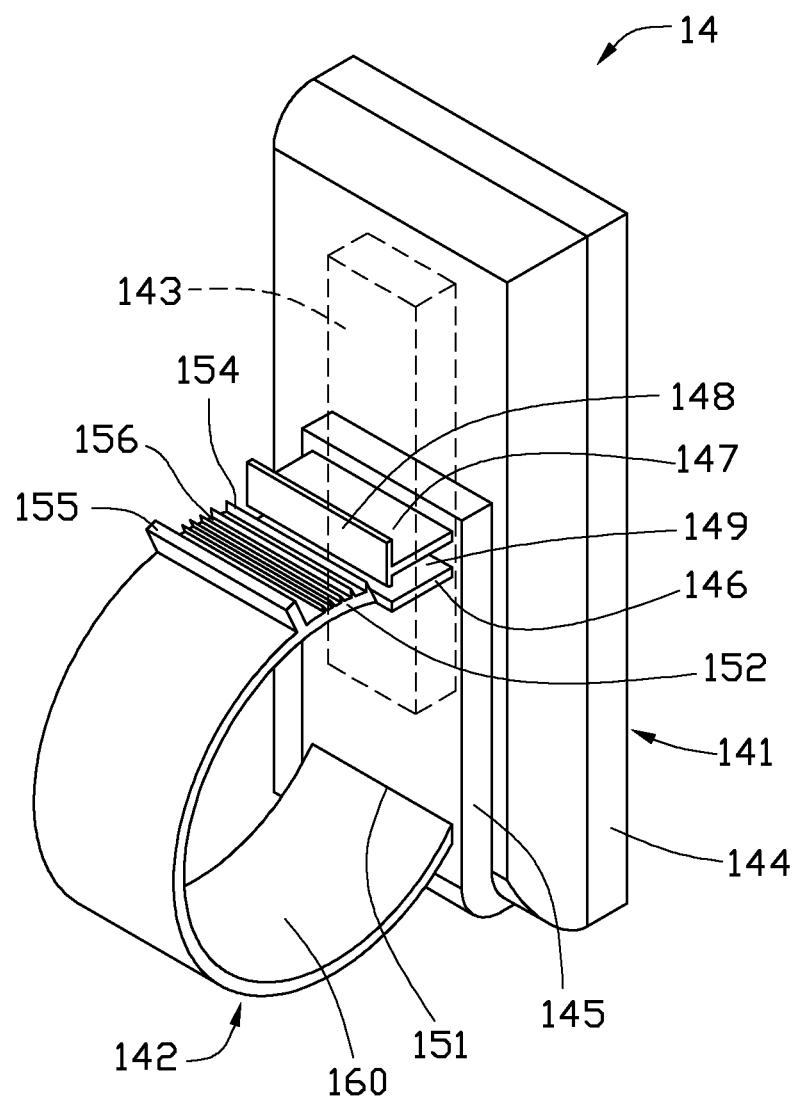
FIG. 3 is a schematic, isometric view of the clamping piece of FIG. 2.

Referring to FIG. 3, at the same time, the two clamping pieces 14 are respectively mounted on the two fixing pieces 12. Each of the clamping pieces 14 includes a base 141 and a clamping band 142. The base 141 includes a main part 144. The main part 144 defines a hole 143 thereof. The hole 143 is firmly engaged with the fixing part 122 to connect the clamping piece 14 to the corresponding fixing piece 12. The base 141 further includes a projected part 145 extending from the main part 144. A first fixing portion 146 and an opposite second fixing portion 147 extend from the projected part 145. The first and second fixing portions 146, 147 define a slot 149 therebetween. A hook 148 is fixed on an end of the second fixing portion 147 opposite to the projected part 145 and one end of the hook 148 extends towards the first fixing portion 146. The clamping band 142 includes a fixed end 151 and a slide end 152. The fixed end 151 is fixed on the projected part 145 away from the slot 149. The slide end 152 includes a number of spaced fixing teeth 154 and a stopper 155. The stopper 155 is near the fixed end 151 relative to the fixing teeth 154. Every two fixing teeth 154 define a fixing groove 156 therebetween. The clamping band 142 winds around the corresponding external power line 13. The slide end 152 is inserted into the slot 149. The hook 148 is engaged with one of the fixing grooves 156 to fix the slide end 152. The clamping band 142 and the base 141 cooperatively form a loop 160. The slide end 152 can slide in the slot 149 till the stopper 155 contacts the hook 148. By sliding the slide end 152 in the slot 149, the dimensions of the loop 160 can be adjusted to be smaller than the plug 131. The base 141 and the clamping band 142 cooperatively keep the plug 131 firmly in the socket 117.

When one of the power sources 11 needs to be replaced, the connection between the power source 11 and the computer case is undone, and the slide end 152 is slid out from the slot 149 to free the plug 131, then the power source 11 can be easily taken out from the computer case by pulling the fixing piece 12 out.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A power module comprising:
   at least one power source, each power source comprising an end defining a socket;
   at least one external power line, each external power line comprising a plug, the plug being inserted into the socket;
   at least one fixing piece fixed at the end of the power source; and
   at least one clamping piece, each clamping piece comprising:
     a base mounted on a corresponding one of the at least one fixing piece;
     two parallel fixing portions extending from the base, wherein a slot is defined between the two parallel fixing portions, one of the fixing portions comprises a hook extending in the slot; and
     a clamping band comprising a fixed end fixed on the base and a slide end; wherein the slide end comprises a number of spaced fixing teeth, a fixing groove is defined between each two of the fixing teeth, the clamping band winds around a corresponding one of the at least one external power line, the slide end is inserted into the slot, the hook is engaged with one fixing groove to lock the slide end in the slot, the clamping band and the base cooperatively hold the corresponding external power line, the slide end further comprises a stopper, and the stopper is near the fixed end relative to the fixing teeth.

2. The power module of claim 1, wherein the base defines a hole, the hole is firmly engaged with the corresponding fixing piece to connect the clamping piece to the corresponding fixing piece.

3. The power module of claim 2, wherein the base comprises a main part and a projected part extending from the main part, the hole is defined in the main part, and the two fixing portions extend from the projected part.

4. The power module of claim 1, wherein the end of each power source further comprises at least one fan.

5. The power module of claim 1, wherein each fixing piece comprises a connecting part and a fixing part, the connecting part defines two connecting holes, the connecting holes are configured for being engaged with fasteners to fix the fixing piece on a corresponding power source, and the fixing part is opposite to the connecting part and positioned on the base of a corresponding one of the least one clamping piece.

6. The power module of claim 1, wherein the number of the at least one power source is two, and the two power sources are stacked together.

\* \* \* \* \*